United States Patent
Lee et al.

(10) Patent No.: US 12,019,828 B2
(45) Date of Patent: Jun. 25, 2024

(54) TOUCH CONTROLLER AND OPERATING METHOD OF THE SAME

(71) Applicant: SAMSUNG ELECTRONICS CO., LTD., Suwon-si (KR)

(72) Inventors: Choonghoon Lee, Suwon-si (KR); Minsung Kim, Suwon-si (KR); Kyungjik Min, Suwon-si (KR); Seunghoon Baek, Suwon-si (KR); Kyeonggon Lee, Suwon-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 18/350,578

(22) Filed: Jul. 11, 2023

(65) Prior Publication Data

US 2024/0069673 A1 Feb. 29, 2024

(30) Foreign Application Priority Data

Aug. 31, 2022 (KR) .................. 10-2022-0110153

(51) Int. Cl.
*G06F 3/041* (2006.01)
*G06F 3/044* (2006.01)

(52) U.S. Cl.
CPC ........ *G06F 3/0418* (2013.01); *G06F 3/04166* (2019.05); *G06F 3/0446* (2019.05)

(58) Field of Classification Search
CPC ... G06F 3/04166; G06F 3/0418; G06F 3/0446
See application file for complete search history.

(56) References Cited

U.S. PATENT DOCUMENTS

| | | | |
|---|---|---|---|
| 5,767,747 A | 6/1998 | Pricer | |
| 7,292,832 B2 | 11/2007 | Ferguson | |
| 7,982,549 B1 | 7/2011 | Husted et al. | |
| 8,466,751 B2 | 6/2013 | Simondin | |
| 8,872,548 B2 | 10/2014 | Liu et al. | |
| 9,835,713 B2 | 12/2017 | Von Rhein | |
| 10,116,353 B2 | 10/2018 | Jung | |
| 10,153,773 B2 | 12/2018 | Stapleton et al. | |

FOREIGN PATENT DOCUMENTS

| | | |
|---|---|---|
| KR | 20070071671 A | 7/2007 |
| KR | 101942719 B1 | 4/2019 |

*Primary Examiner* — Michael Pervan
(74) *Attorney, Agent, or Firm* — Myers Bigel, P.A.

(57) ABSTRACT

A touch controller, a touch screen device, and an operating method of the touch controller are provided. A touch controller, performing a touch sensing operation of sensing a touch of a touch panel in a touch sensing period, includes a first clock generator configured to generate a low frequency clock signal for calculating the touch sensing period, a second clock generator configured to generate a high frequency clock signal for performing the touch sensing operation, and a first calibration circuit configured to calibrate a frequency of the low frequency clock signal by using the high frequency clock signal.

20 Claims, 11 Drawing Sheets

TOUCH CONTROLLER AND OPERATING METHOD OF THE SAME

CROSS-REFERENCE TO RELATED APPLICATION

This application is based on and claims priority under 35 U.S.C. § 119 to Korean Patent Application No. 10-2022-0110153, filed on Aug. 31, 2022, in the Korean Intellectual Property Office, the disclosure of which is incorporated by reference herein in its entirety.

BACKGROUND

The inventive concept relates to a touch controller, and more particularly, to a touch controller for calibrating a touch sensing period, a touch screen device including the touch controller, and an operating method of the touch controller.

Touch panels may be equipped in various electronic devices. Touch panels may provide a region capable of being touched by a finger of a user of an electronic device or a pointer of a stylus pen or the like and may include a plurality of electrodes which provide sensing signals based on the occurrence or not of a touch. Also, a touch controller may process a sensing signal provided from each of electrodes included in a touch panel, and thus, may detect the occurrence or not of a touch and a touch position. However, a period where a touch controller senses a touch may be changed based on an internal driving environment and an external environment, and there is a problem where a misrecognition of a touch occurs.

SUMMARY

The inventive concept provides a touch controller which calibrates a period of a clock signal to decrease a variation width of a touch sensing period, a touch screen device including the touch controller, and an operating method of the touch controller.

According to an aspect of the inventive concept, a touch controller comprising: a first clock generator that is configured to generate a low frequency clock signal to calculate a touch sensing period; a second clock generator that is configured to generate a high frequency clock signal to perform a touch sensing operation; and a first calibration circuit that is configured to calibrate a frequency of the low frequency clock signal by using the high frequency clock signal, wherein the touch controller is configured to perform the touch sensing operation to sense a touch of a touch panel in the touch sensing period.

According to another aspect of the inventive concept, an operating method of a touch controller, the operating method comprising: supplying power to the touch controller; generating a low frequency clock signal; calculating a touch sensing period using the low frequency clock signal; generating a high frequency clock signal; sensing a touch of a touch panel using the high frequency clock signal in a touch sensing interval having the touch sensing period; and calibrating a frequency of the low frequency clock signal by using the high frequency clock signal.

According to another aspect of the inventive concept, a touch screen device comprising: a touch panel that includes a touch sensor array; and a touch controller that is configured to supply a driving signal to the touch sensor array, wherein the touch controller is configured to generate the driving signal in a touch sensing interval using a high frequency clock signal, calculate a touch sensing period in the touch sensing interval using a low frequency clock signal, and calibrate a frequency of the low frequency clock signal using the high frequency clock signal.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

Figure 1:
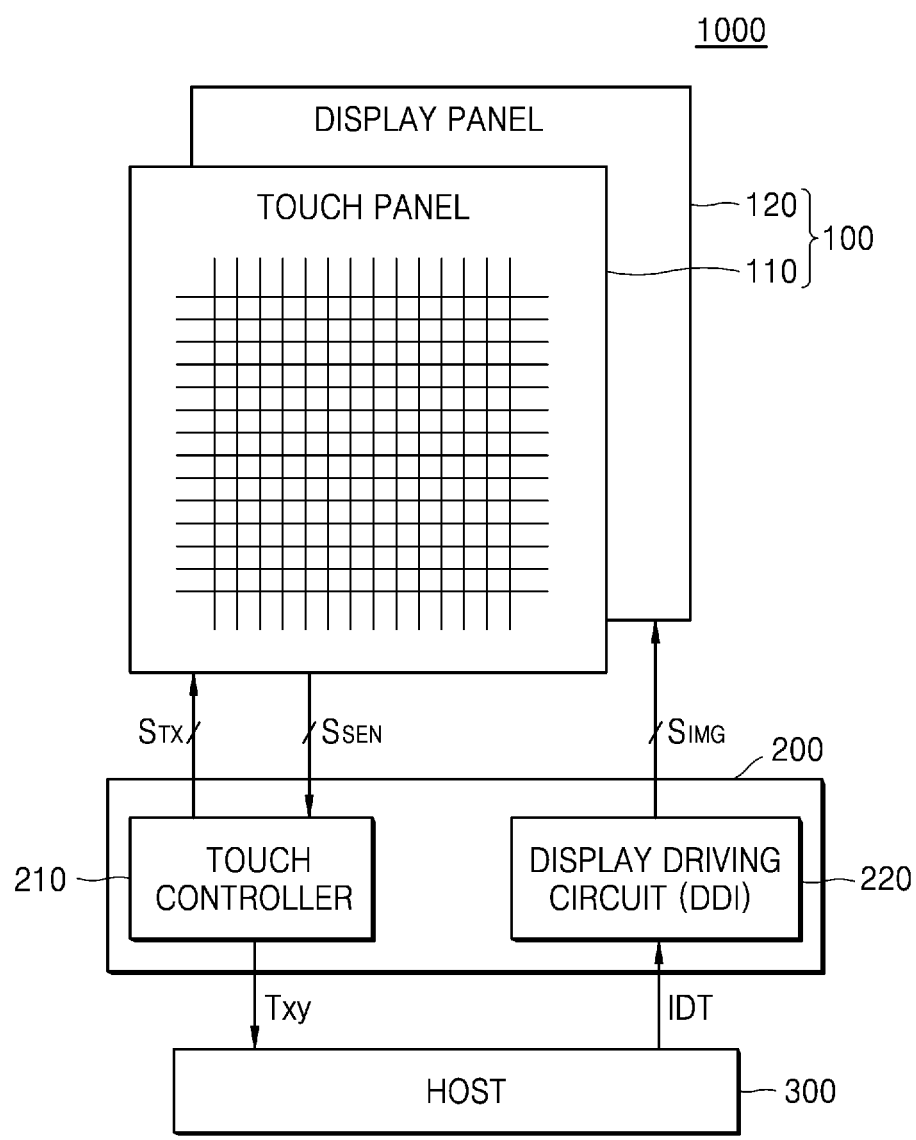
FIG. 1 is a block diagram illustrating a touch screen device according to an embodiment.

FIG. 1 is a block diagram illustrating a touch screen device 1000 according to an embodiment. The touch screen device 1000 may be equipped in various electronic devices and may be referred to as a touch sensing device. For example, the touch screen device 1000 may be equipped in electronic devices such as tablet personal computers (PCs), e-readers, personal digital assistants (PDAs), portable multimedia players (PMPs), mobile terminals, smartphones, wearable devices, internet of things (IoT) devices, refrigerators, and navigation devices. Also, the touch screen device 1000 may be equipped in an electronic device which is provided as a part of vehicles, furniture, manufacturing facilities, doors, and various measurement devices.

Referring to FIG. 1, the touch screen device 1000 may include a touch screen 100 and a touch screen driving circuit 200 for driving the touch screen 100. The touch screen 100 may include a touch panel 110 and a display panel 120 and may provide a touch sensing function and a display function. The touch screen driving circuit 200 may include a touch controller 210 and a display driving circuit 220. In FIG. 1, the touch screen device 1000 is illustrated as including a host 300, but is not limited thereto and the host 300 may be implemented independently from the touch screen device 1000.

The touch screen 100 may display an image and may receive a touch input of a user. The touch screen 100 may operate as an input/output device of an electronic device. In an embodiment, the touch screen 100 may further include a fingerprint sensor, and the touch screen device 1000 may perform a fingerprint recognition function.

The touch panel 110 may sense a touch (or a touch input) applied to the touch screen 100 and may output sensing signals $S_{SEN}$. In this case, a touch may include a case where a conductive object is approximate to the touch screen 100, in addition to a case where a conductive object (for example, a finger and palm of a user, a touch pen, a stylus pen, and an active pen) directly contacts the touch screen 100. The touch panel 110 may be stacked on the display panel 120 and may be attached on a front surface (for example, a surface for discharging optical signals) of the display panel 120. In an embodiment, the touch panel 110 may cover the front surface of the display panel 120.

The touch panel 110 may be implemented as a transparent panel including a touch-sensitive surface. Alternatively, the touch panel 110 may be implemented as a touch sensor array where transparent electrodes are patterned. In an embodiment, the touch panel 110 may be referred to as a touch sensor array or a touch sensing layer. The touch panel 110 may include a plurality of touch electrodes arranged as a matrix type. The sensing signals $S_{SEN}$ based on one of various touch sensing schemes may be output through the plurality of touch electrodes. For example, the plurality of touch electrodes may respectively output the sensing signals $S_{SEN}$ based on a capacitance sensing scheme.

Figure 2:
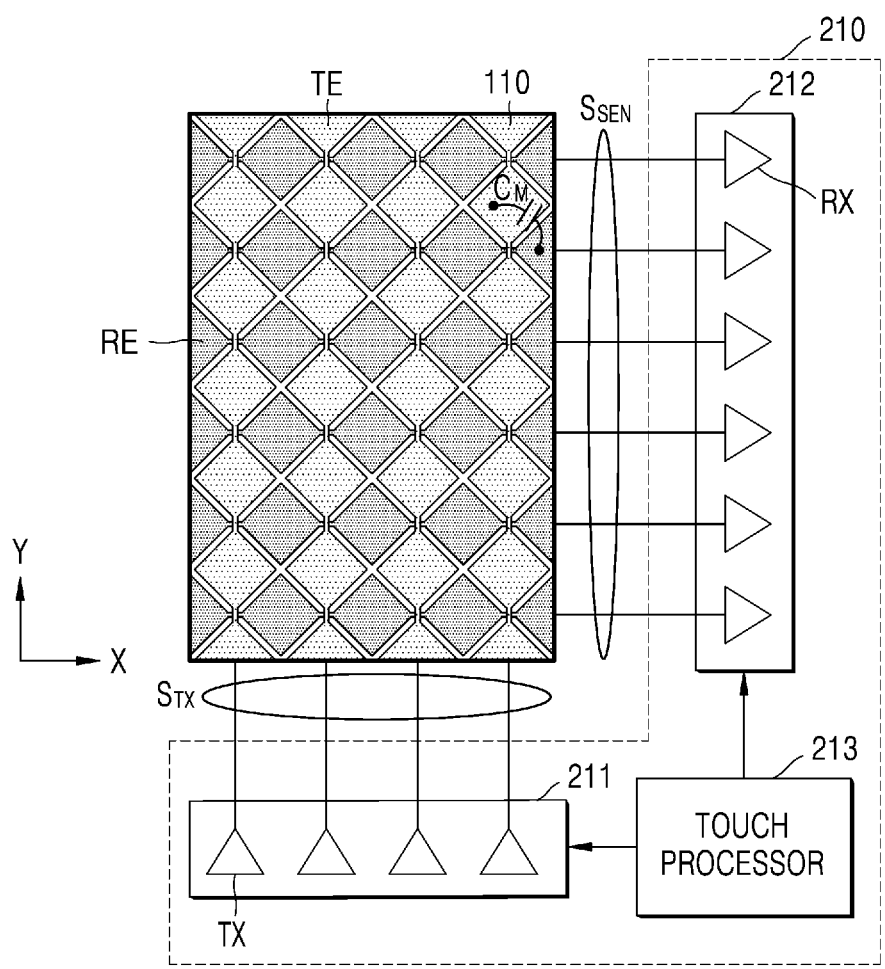
FIG. 2 is a diagram illustrating in more detail a touch panel and a touch controller of FIG. 1, according to an embodiment.

In an embodiment, the plurality of touch electrodes may include a plurality of driving electrodes (e.g., TE in FIG. 2) and a plurality of reception electrodes (e.g., RE in FIG. 2). For example, the touch panel 110 may include the plurality of driving electrodes to which a driving signal $S_{TX}$ is applied and the plurality of reception electrodes to which the sensing signal $S_{SEN}$ is output, the plurality of driving electrodes may extend in a first direction (for example, an X-axis direction or a Y-axis direction), and a plurality of sensing electrodes may extend in a second direction (for example, the Y-axis direction or the X-axis direction). The plurality of driving electrodes may intersect with the plurality of sensing electrodes, and a mutual capacitance may be generated between the plurality of driving electrodes and the plurality of sensing electrodes.

In an embodiment, the plurality of touch electrodes may include the plurality of sensing electrodes. For example, the touch panel 110 may include the plurality of sensing electrodes arranged as a matrix type, and a capacitance may be generated in each of the plurality of sensing electrodes. For example, a capacitance between each of the plurality of sensing electrodes and ground (or a conductive layer of the touch screen 100) may be generated, and the capacitance may be referred to as a self-capacitance. The driving signal $S_{TX}$ may be applied to each of the plurality of sensing electrodes, and moreover, the sensing signal $S_{SEN}$ may be output from each of the plurality of sensing electrodes. In other words, each of the plurality of sensing electrodes may operate as a driving electrode and a reception electrode.

The driving signal $S_{TX}$ may be applied through the driving electrode, the sensing signal $S_{SEN}$ representing a capacitance (for example, a mutual capacitance or a self-capacitance) may be generated based on the driving signal $S_{TX}$, and the sensing signal $S_{SEN}$ may be output through the reception electrode. When a finger of a user or a conductive object such as an active pen touches an electrode or is adjacent to the electrode, a capacitance corresponding to the touched electrode may vary, and the sensing signal $S_{SEN}$ output from the touch panel 110 may vary based on the varied capacitance. For example, a level of the sensing signal $S_{SEN}$ may increase or decrease more than before a touch occurs.

The display panel 120 may include a plurality of gate lines, a plurality of source lines, and a plurality of pixels which are arranged as a matrix type at points at which the plurality of gate lines intersect with the plurality of source lines. As described above, the display panel 120 may include a pixel array or a display layer including the plurality of pixels. The plurality of pixels may display an image, based on an image signal $S_{IMG}$ received through the plurality of source lines and the plurality of gate lines. The image may be updated based on a predetermined frame rate.

The display panel 120 may further include a common electrode disposed on the display layer. The common electrode may be disposed between the display layer and the touch sensing layer. The plurality of gate lines, the plurality of source lines, and the plurality of pixels may be provided in the display layer. A voltage (for example, a ground voltage) supplied to the plurality of pixels in common may be applied to the common electrode.

The display panel 120 may be implemented with one of a light-emitting diode (LED) display, an organic LED (OLED) display, an active-matrix OLED (AMOLED) display, a liquid crystal display (LCD), an electrochromic display (ECD), a digital mirror device (DMD), an actuated mirror device (AMD), a grating light valve (GLV), a plasma display panel (PDP), an electro luminescent display (ELD), a vacuum fluorescent display (VFD), and moreover, may be implemented as another kind of flat panel or flexible panel display.

In FIG. 1, each of the touch panel 110 and the display panel 120 is illustrated as an individual element, but is not limited thereto. For example, the touch screen 100 may be implemented as an in-cell type panel where the electrodes of the touch panel 110 are coupled to the pixels of the display panel 120 or an on-cell type panel where the electrodes of the touch panel 110 are disposed on the pixels of the display panel 120.

The touch controller 210 may scan (for example, drive and sense) the touch panel 110. The touch controller 210 may supply the driving signal $S_{TX}$ to the touch panel 110 and may receive the sensing signal $S_{SEN}$, generated based on the driving signal $S_{TX}$, from the touch panel 110. The touch controller 210 may determine the occurrence or not of the touch input and may calculate a position (i.e., touch coordinates Txy) at which the touch input occurs, and then, may supply the touch coordinates Txy to the host 300.

Also, in an embodiment, the touch controller 210 may transfer, to the host 300, a signal including information (e.g., type of the touch input) about the occurrence or not of a touch in addition to the touch coordinates Txy. For example, when a double tap is sensed in the touch panel 110, the touch controller 210 may transfer a signal, indicating that the double tap is sensed, to the host 300. In an embodiment, the touch controller 210 may calculate touch pressure and may provide the host 300 with the touch pressure and the touch coordinates Txy.

The touch controller 210 may operate in a normal mode or an idle mode. The idle mode may be an operation mode where power consumption is less than that of the normal mode and may be referred to as a low power mode. In the idle mode, the touch controller 210 may sense a touch of the touch panel 110 in a touch sensing interval having a touch sensing period. In an embodiment, when the touch controller 210 operates in the normal mode, the display driving circuit 220 may also operate in the normal mode, and when the touch controller 210 operates in the idle mode, the display driving circuit 220 may also operate in the idle mode. For example, in the idle mode, the display driving circuit 220 may operate in an always on display (AOD) mode. The normal mode may denote, for example, a mode where the display panel 120 displays a screen while the host 300 is in an active state, or may denote a state where steady state power is supplied to the host 300. The normal mode may denote, for example, a mode where the host 300 controls the display driving circuit 220, and thus, the display panel 120 displays an image. The idle mode may denote, for example, a mode where the display panel 120 displays a screen while the host 300 is in an inactive state. The inactive state may denote, for example, a turn-off state where booting is needed for changing a state to the active state. The inactive state may denote, for example, a state where power supplied to the host 300 is limited, or a state where lower power than power supplied in the normal mode is provided.

In an embodiment, the touch controller 210 may calibrate a frequency of a low frequency clock signal (e.g., CLK_LF) counting a touch sensing period by using a high frequency clock signal (e.g., CLK_HF) for driving the touch panel 110. Even when a frequency of the low frequency clock signal is changed by an internal driving environment and an external environment, a frequency of the low frequency clock signal may be calibrated to maintain a target value, and thus, a change in the touch sensing period may be prevented. Accordingly, the confusion of a finger tap and a finger press based on a variation of the touch sensing period in the idle mode may be prevented.

The display driving circuit 220 may receive image data IDT from the host 300 and may drive the display panel 120 so that the display panel 120 displays an image based on the image data IDT. The display driving circuit 220 may convert the image data IDT into image signals $S_{IMG}$ which are analog signals and may supply the image signals $S_{IMG}$ to corresponding pixels of the display panel 120. The touch controller 210 and the display driving circuit 220 may transfer or receive a synchronization signal and state information therebetween.

The host 300 may perform an overall control operation on the touch screen device 1000. The host 300 may generate data associated with a display operation, supply the generated data to the display driving circuit 220, receive the occurrence or not of a touch, the touch coordinates Txy, and touch pressure (intensity) from the touch controller 210, analyze the touch based thereon, and perform a control operation based on a touch position and touch intensity.

In an embodiment, the host 300 may include, for example, an application processor (AP), and the AP may be implemented as a system on chip (SoC). The SoC may include a system bus (e.g., bus 2400 in FIG. 11) to which a protocol having certain bus standard is applied and may include various intellectual properties (IPs) connected to the system bus. The standard of the system bus may use various kinds of protocols such as the advanced microcontroller bus architecture (AMBA) protocol of Advanced RISC Machine (ARM), but not limited thereto.

FIG. 2 is a diagram illustrating in more detail the touch panel 110 and the touch controller 210 of FIG. 1, according to an embodiment.

Referring to FIG. 2, the touch panel 110 and the touch controller 210 may configure a touch sensing device. The touch panel 110 may include a plurality of driving electrodes TE and a plurality of reception electrodes RE, and the electrodes may be referred to as a plurality of touch electrodes, a plurality of sensing electrodes, or a plurality of sensing units. In an embodiment, the plurality of reception electrodes RE may extend in a first direction (for example, an X-axis direction), and the plurality of driving electrodes TE may extend in a second direction (for example, a Y-axis direction). The first direction and the second direction may be directions perpendicular to each other, and the plurality of reception electrodes RE may intersect with the plurality of driving electrodes TE. A mutual capacitance $C_M$ may be generated between the driving electrode TE and the reception electrode RE. In order to improve a touch sensing characteristic (for example, a touch sensing sensitivity), a unit electrode of a plurality of touch electrodes (for example, the plurality of driving electrodes TE and/or the plurality of reception electrodes RE) may have a certain shape (for example, a rhombus shape illustrated in FIG. 2) or pattern, but the inventive concept is not limited thereto.

The touch controller 210 may include a transfer circuit 211, a reception circuit 212, and a touch processor 213. The transfer circuit 211 may include a plurality of transmitters TX, and the plurality of transmitters TX may supply the driving signal $S_{TX}$ to the plurality of driving electrodes TE. According to an embodiment, the transfer circuit 211 may further include an encoder, and the encoder may be implemented independently from the transfer circuit 211. The reception circuit 212 may include a plurality of receivers RX, and the plurality of receivers RX may receive the sensing signal $S_{SEN}$ from the plurality of reception electrodes RE. According to an embodiment, the reception circuit 212 may further include a decoder, and the decoder may be implemented independently from the reception circuit 212. The transfer circuit 211 may be referred to as a driving circuit, and the reception circuit 212 may be referred to as a sensing circuit. Each of the transfer circuit 211 and the reception circuit 310 may include an analog front end (AFE).

The sensing circuit (e.g., the reception circuit 212) may represent a mutual capacitance $C_M$ between the driving electrode TE to which the driving signal $S_{TX}$ is applied and the reception electrode RE receiving the sensing signal $S_{SEN}$, and for example, when a touch occurs at a point of the touch panel 110, the mutual capacitance $C_M$ at the point may decrease and a level of the sensing signal $S_{SEN}$ may decrease or increase more than before a touch occurs. The plurality of receivers RX may amplify and analog-digital convert the received sensing signal $S_{SEN}$ to generate a plurality of sensing values.

In an embodiment, the touch panel 110 may include a plurality of sensing electrodes (e.g., the plurality of driving electrodes TE and the plurality of reception electrodes RE) which respectively operate as a driving electrode and a reception electrode. The plurality of sensing electrodes may be arranged as a matrix type, and each of the plurality of sensing electrodes may be referred to as a dot sensor. The transmitter (e.g., TX) and the receiver (e.g., RX) may be implemented as one body, in order to provide a driving signal (e.g., Srx) to each of a plurality of dot sensors and receive a sensing signal (e.g., $S_{SEN}$).

The touch processor 213 may control the overall operation of the touch controller 210, and for example, may control an operation timing of each of the driving circuit 211 and the reception circuit 212. Also, the touch processor 213 may calculate the occurrence or not of a touch, a touch position (e.g., Txy), and touch intensity (pressure), based on a plurality of sensing values or a plurality of touch values received from the reception circuit 212.

In an embodiment, the touch processor 213 may calculate a period of a touch sensing interval where a touch sensing operation is performed in the idle mode, based on a low frequency clock signal. The touch processor 213 may include at least one of a first clock generator (e.g., first clock generator 214 in FIG. 4) which generates the low frequency clock signal, a second clock generator (e.g., second clock generator 215 in FIG. 4) which generates a high frequency clock signal, and a calibration circuit (e.g., calibration circuit 216 in FIG. 4) which calibrates a frequency of the low frequency clock signal. However, the inventive concept is not limited thereto, and the first clock generator, the second clock generator, and the calibration circuit may be implemented as a separate element which is independent from the touch processor 213.

Figure 3:
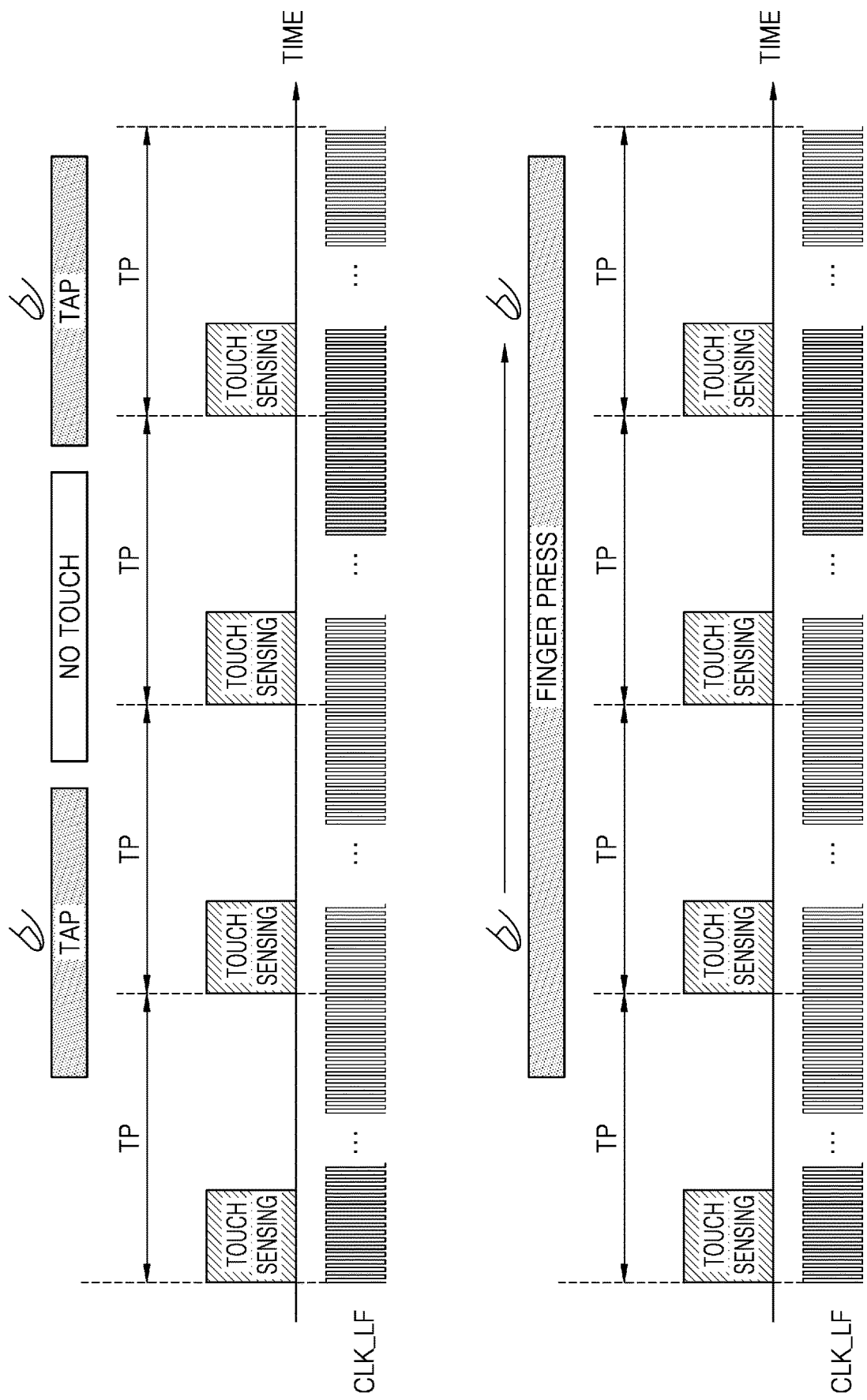
FIG. 3 is a diagram for describing an operation of a touch controller according to an embodiment.

FIG. 3 is a diagram for describing an operation of a touch controller 210 according to an embodiment. The touch controller 210 may operate in the normal mode or the idle mode. In the idle mode, the touch controller 210 may sense a touch of the touch panel 110 in a touch sensing interval having a touch sensing period TP. In the touch sensing period TP, the touch sensing interval may be a partial interval thereof. For example, the touch sensing period TP may have an inverse number value of 60 Hz, but is not limited thereto.

Referring to FIGS. 1 and 3, the touch controller 210 may calculate the touch sensing period TP by using a low frequency clock signal CLK_LF. For example, the touch processor 213 may count the low frequency clock signal CLK_LF by a certain number, and thus, may determine a start time of the touch sensing interval and may determine the touch sensing interval.

Subsequently, when a touch comprises a first touch (e.g., a tap TAP), a non-touch, and a second touch, and the first touch, the non-touch, and the second touch are sequentially sensed in a plurality of continuous touch sensing intervals, the touch controller 210 may determine a double tap. For example, when a touch is sensed in a first touch sensing interval, a touch is not sensed in a second touch sensing interval succeeding the first touch sensing interval, and a touch is sensed in a third touch sensing interval succeeding the second touch sensing interval, the touch controller 210 may determine that a double tap occurs. On the other hand, when a touch is sensed in the plurality of continuous touch sensing intervals, the touch controller 210 may determine that a finger press occurs.

In an embodiment, when the double tap is sensed, the touch controller 210 may transfer a signal, representing that the double tap is sensed, to the host 300. When the signal is received, the host 300 may change an operation mode. When the double tap is sensed, the touch controller 210 may change a mode from the idle mode to the normal mode (based on the control or state of the host 300).

The touch controller 210 may calculate the touch sensing period TP by using the low frequency clock signal CLK_LF, and thus, may calibrate a frequency of the low frequency clock signal CLK_LF so as to prevent a variation of the frequency of the low frequency clock signal CLK_LF. The touch controller 210 may calibrate a frequency of the low frequency clock signal CLK_LF by using a high frequency clock signal (e.g., CLK_HF) that has a higher frequency than the low frequency clock signal CLK_LF. Accordingly, as a touch sensing period is changed (e.g., adjusted), the confusion of a finger tap and a finger press may be prevented, and the accuracy of touch sensing may increase.

Figure 4:
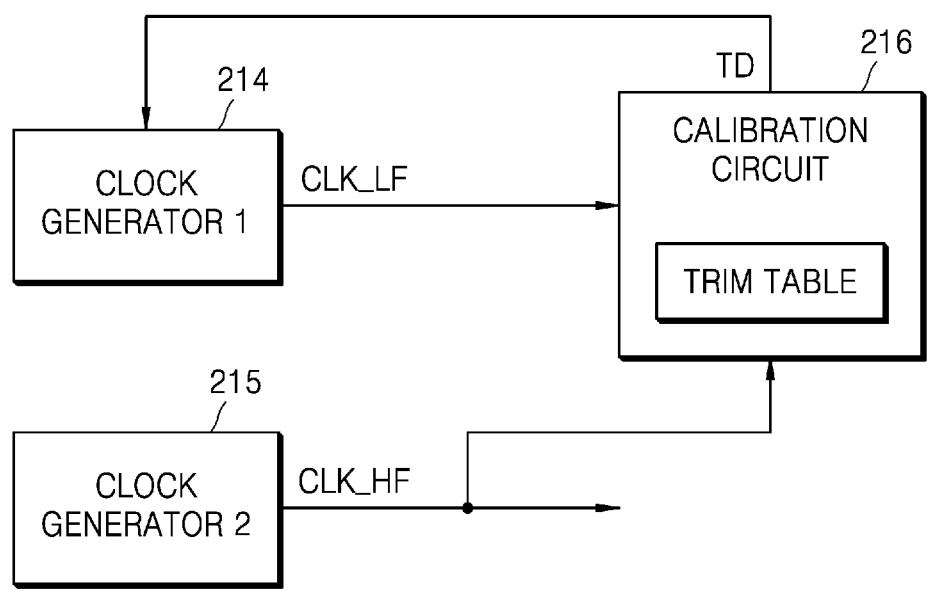
FIG. 4 is a diagram illustrating some elements of a touch controller according to an embodiment.
Figure 5:
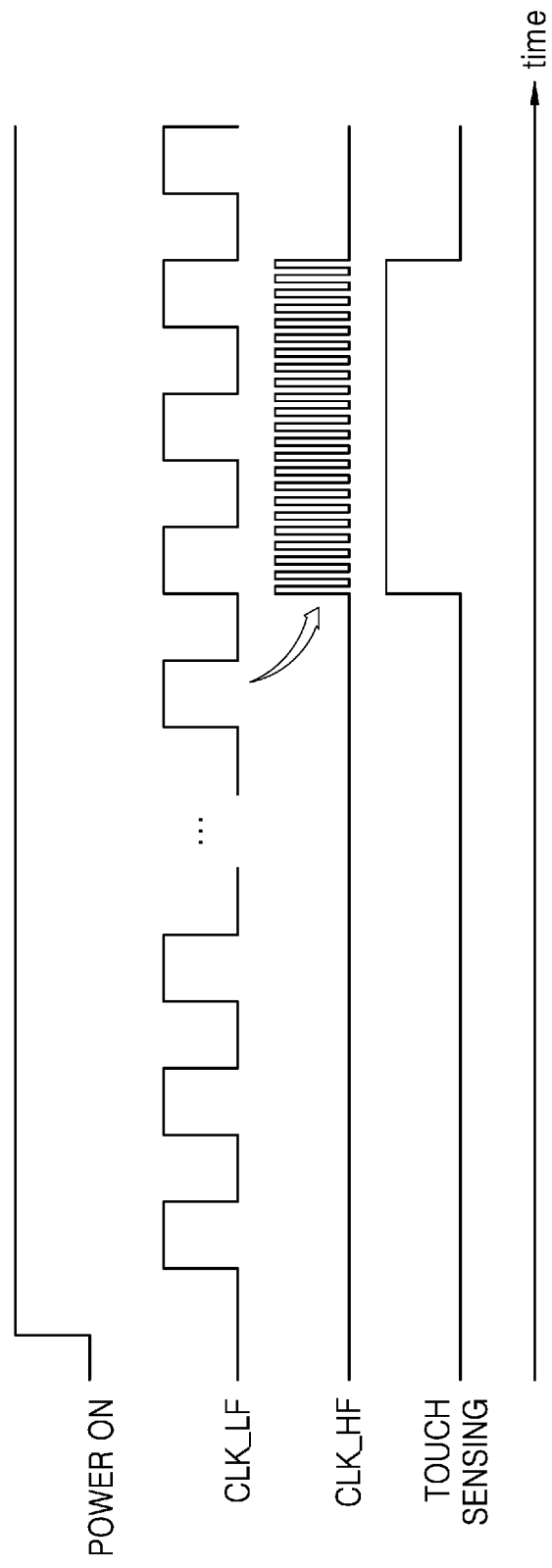
FIG. 5 is a timing diagram showing a low frequency clock signal and a high frequency clock signal each generated by a touch controller according to an embodiment.

FIG. 4 is a diagram illustrating some elements of a touch controller 210 according to an embodiment. FIG. 5 is a timing diagram showing a low frequency clock signal (e.g., CLK_LF) and a high frequency clock signal (e.g., CLK_HF) each generated by the touch controller 210 according to an embodiment.

Referring to FIGS. 2 and 4, the touch controller 210 may include a first clock generator 214, a second clock generator 215, and a calibration circuit 216. In an embodiment, each of the first clock generator 214, the second clock generator 215, and the calibration circuit 216 may be an individual element in the touch controller 210 and may be implemented in hardware. Alternatively, in an embodiment, at least one of the first clock generator 214, the second clock generator 215, and the calibration circuit 216 may be included in the touch processor 213. For example, the touch processor 213 may include the calibration circuit 216. Each of the first clock generator 214, the second clock generator 215, and the calibration circuit 216 may be implemented in hardware or software, or by a combination thereof.

The first clock generator 214 may generate a low frequency clock signal CLK_LF, and the second clock generator 215 may generate a high frequency clock signal CLK_HF. A frequency of the high frequency clock signal CLK_HF may be higher than that of the low frequency clock signal CLK_LF. For example, the low frequency clock signal CLK_LF may be 500 kHz, and the high frequency clock signal CLK_HF may be 100 MHz. Furthermore, a frequency of the low frequency clock signal CLK_LF and a frequency of the high frequency clock signal CLK_HF may be variously changed.

The calibration circuit 216 may calibrate a frequency of the low frequency clock signal CLK_LF by using the high frequency clock signal CLK_HF. The calibration circuit 216 may count a period of the low frequency clock signal CLK_LF by using the high frequency clock signal CLK_HF and may provide trim data TD to the first clock generator 214. The calibration circuit 216 may include a counter.

The calibration circuit 216 may generate the trim data TD, based on a trim table. The trim table may store information about trim data corresponding to the degree of adjustment of a frequency of the low frequency clock signal CLK_LF. For example, the first clock generator 214 may include a ring oscillator, and as a current supplied to the ring oscillator is adjusted based on the trim data, a frequency of the low frequency clock signal CLK_LF may be adjusted.

The first clock generator 214 may generate the low frequency clock signal CLK_LF having a frequency based on the trim data TD. The calibration circuit 216 may supply the trim data TD to the first clock generator 214 so that a frequency of the low frequency clock signal CLK_LF maintains a target value even when a frequency of the low frequency clock signal CLK_LF is changed based on an external environment of the touch controller 210 or an internal driving environment of the touch controller 210.

Referring to FIGS. 2, 4, and 5, when the touch controller 210 is turned on with power supplied thereto, the first clock generator 214 may generate the low frequency clock signal CLK_LF. In this case, the first clock generator 214 may generate the low frequency clock signal CLK_LF, based on a predetermined initial setting value. That is, the first clock generator 214 may generate the low frequency clock signal CLK_LF to have a predetermined frequency.

For example, initial setting trim data may be stored in the calibration circuit 216, and when the calibration circuit 216 is turned on, the calibration circuit 216 may supply the initial setting trim data to the first clock generator 214. The first clock generator 214 may generate the low frequency clock signal CLK_LF having a (an initial) frequency based on the initial setting trim data.

The touch processor 213 may set a touch sensing interval by using the low frequency clock signal CLK_LF. In the set touch sensing interval, the touch processor 213 may control the second clock generator 215 to generate the high frequency clock signal CLK_HF. The high frequency clock signal CLK_HF may be supplied to the transfer circuit 211, and the transfer circuit 211 may supply the driving signal $S_{TX}$ to the touch panel 110, based on the high frequency clock signal CLK_HF. As the driving signal $S_{TX}$ is supplied to the touch panel 110, a touch sensing operation may be performed in the idle mode.

Figure 6:
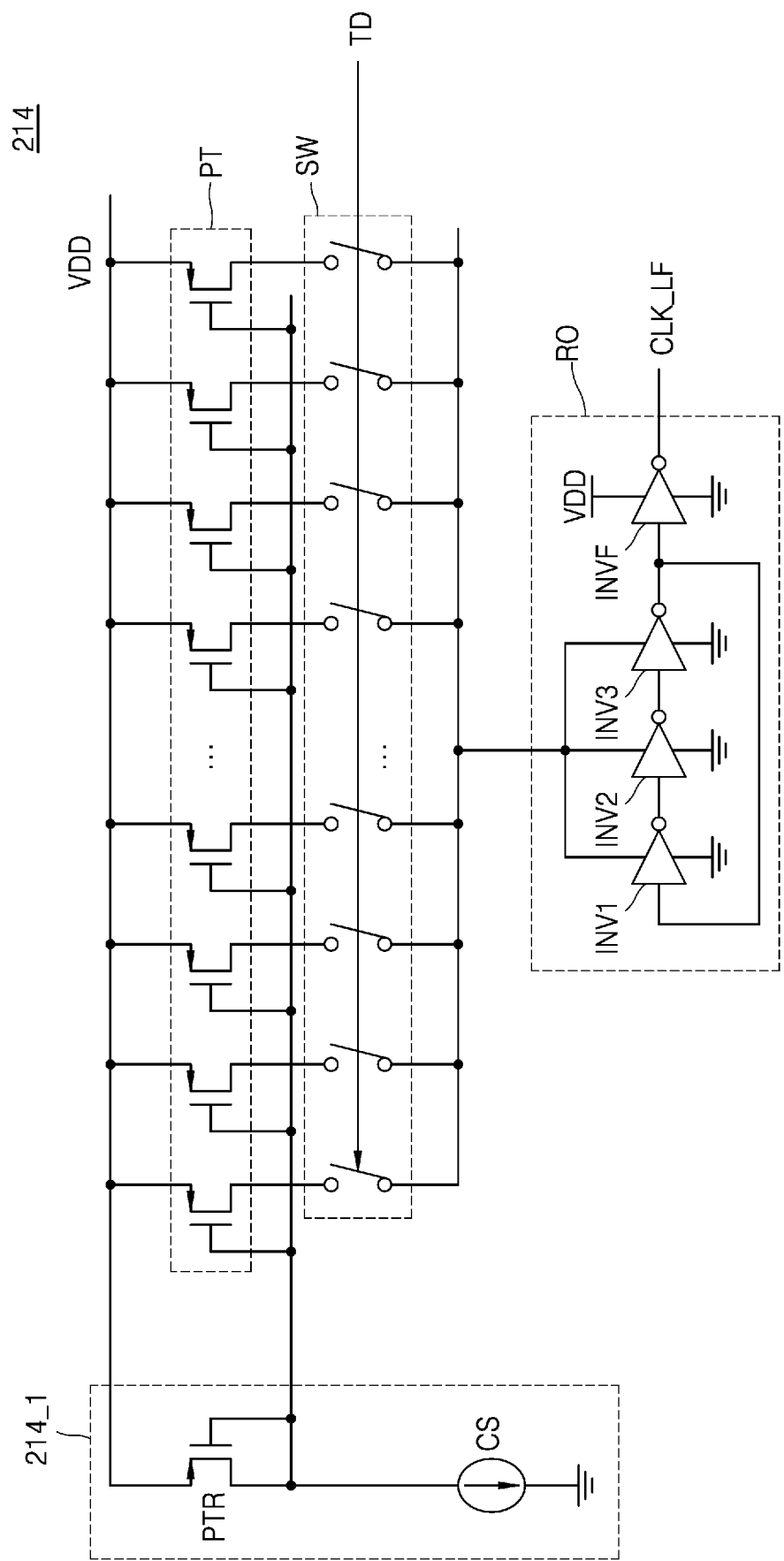
FIG. 6 is a circuit diagram describing a first clock generator of a touch controller according to an embodiment.

FIG. 6 is a circuit diagram describing a first clock generator 214 of a touch controller according to an embodiment. The first clock generator 214 of FIG. 6 may be the first clock generator 214 of FIG. 4. A description of the first clock generator 214 of FIG. 6 may be applied to the second clock generator 215 of FIG. 4.

Referring to FIG. 6, the first clock generator 214 may include a reference current generator 214_1, a plurality of transistors PT, a plurality of switches SW, and a ring oscillator RO. The first clock generator 214 may generate a low frequency clock signal CLK_LF having a frequency based on trim data TD. However, the embodiments of the first clock generator 214 are not limited to the above descriptions.

The reference current generator 214_1 and the plurality of transistors PT may configure, for example, a current mirror structure, but not limited thereto. A current generated by the current mirror structure of the reference current generator 214_1 and the plurality of transistors PT may be supplied to the ring oscillator RO. The reference current generator 214_1 may generate a reference current, and thus, a current corresponding to the reference current may flow in each of the plurality of transistors PT.

The reference current generator 214_1 may, for example, include a current source CS and a transistor PTR connected to the current source CS. In an embodiment, the transistor PTR may be a P-type transistor, and a source terminal thereof may be supplied with a source voltage VDD and a drain terminal and a gate terminal thereof may be connected with each other.

The plurality of transistors PT may be P-type transistors. Gate terminals of the plurality of transistors PT may be connected with each other, and source terminals thereof may be supplied with the source voltage VDD. Each of the plurality of transistors PT may be connected with a corresponding switch of the plurality of switches SW. When a corresponding switch of the plurality of switches SW is turned on, a current corresponding to the reference current may flow in each of the plurality of transistors PT.

The turn-on/off of the plurality of switches SW may be controlled based on the trim data TD. For example, the trim data TD may have bits corresponding to the number of switches SW, and the plurality of switches SW may be turned on or off based on the number of bits corresponding to each of the plurality of switches SW. The number of switches SW and the number of transistors PT are not limited to the illustration of FIG. 6 and may be variously changed.

The ring oscillator RO may generate the low frequency clock signal CLK_LF. The ring oscillator RO may include a plurality of inverters INV1 to INV3 and an output inverter INVF. The plurality of inverters INV1 to INV3 may be connected to the plurality of switches SW, and currents generated by the plurality of transistors PT may be respectively supplied to the plurality of inverters INV1 to INV3. The number of inverters INV1 to INV3 included in the ring oscillator RO is not limited to the illustration of FIG. 6 and may be variously changed.

A signal transfer delay time of each of the plurality of inverters INV1 to INV3 may vary based on a characteristic of a current supplied to the plurality of inverters INV1 to INV3. As the turn-on/off of the plurality of switches SW is controlled based on the trim data TD, a level of a current supplied to the plurality of inverters INV1 to INV3 may vary, and thus, the signal transfer delay time of each of the plurality of inverters INV1 to INV3 may vary, whereby a frequency of the low frequency clock signal CLK_LF may be adjusted.

A circuit of the first clock generator 214 illustrated in FIG. 6 may be an exemplary embodiment, and an embodiment of a touch controller (e.g., the touch controller 210) is not limited thereto. The touch controller may include a clock generator having various circuit structures, which generate a clock signal having a frequency which is changed based on a control signal such as trim data.

Figure 7:
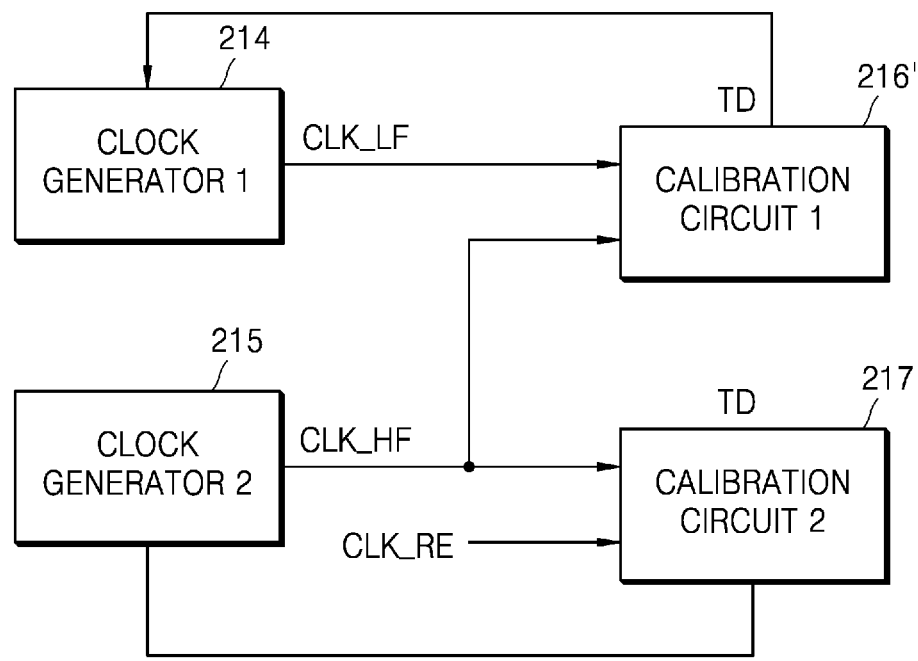
FIG. 7 is a block diagram illustrating some elements of a touch controller according to an embodiment.

FIG. 7 is a block diagram illustrating some elements of a touch controller 210 according to an embodiment. In FIG. 7, the same reference numbers as FIG. 4 refer to like elements, and descriptions which are the same as or similar to the descriptions of FIG. 4 are omitted. A first calibration circuit 216' of FIG. 7 may be the calibration circuit (e.g., calibration circuit 216) of FIG. 4.

Referring to FIGS. 2 and 7, the touch controller 210 may include a first clock generator 214, a second clock generator 215, the first calibration circuit 216', and a second calibration circuit 217. In an embodiment, each of the first clock generator 214, the second clock generator 215, the first calibration circuit 216', and the second calibration circuit 217 may be an individual element in the touch controller 210 and may be implemented in hardware. Alternatively, in an embodiment, at least one of the first clock generator 214, the second clock generator 215, the first calibration circuit 216', and the second calibration circuit 217 may be included in the touch processor 213. For example, the touch processor 213 may include the first calibration circuit 216' and the second calibration circuit 217. The first clock generator 214, the second clock generator 215, the first calibration circuit 216', and the second calibration circuit 217 may be implemented in hardware or software, or by a combination thereof.

The second calibration circuit 217 may calibrate a frequency of a high frequency clock signal CLK_HF by using a reference clock signal CLK_RE. For example, the second calibration circuit 217 may count a period of the high frequency clock signal CLK_HF by using the reference clock signal CLK_RE and may control the second clock generator 215, based on a counting value. The second calibration circuit 217 may include a counter.

The reference clock signal CLK_RE may be supplied from the outside (an external entity, such as an external circuit) of the touch controller 210. For example, the reference clock signal CLK_RE may be supplied from a display driving circuit (for example, 220 of FIG. 1) to the touch controller 210. Alternatively, for example, the reference clock signal CLK_RE may be supplied from a host (for example, 300 of FIG. 1).

In an embodiment, the second calibration circuit 217 may transfer trim data to control the second clock generator 215, based on a trim table. The trim table may store information about trim data corresponding to the degree of adjustment of a frequency of a high frequency clock signal (e.g., CLK_HF). For example, the second clock generator 215 may include a ring oscillator, and as a current supplied to the ring oscillator is adjusted based on the trim data, a frequency of the high frequency clock signal CLK_HF may be adjusted.

Figure 8:
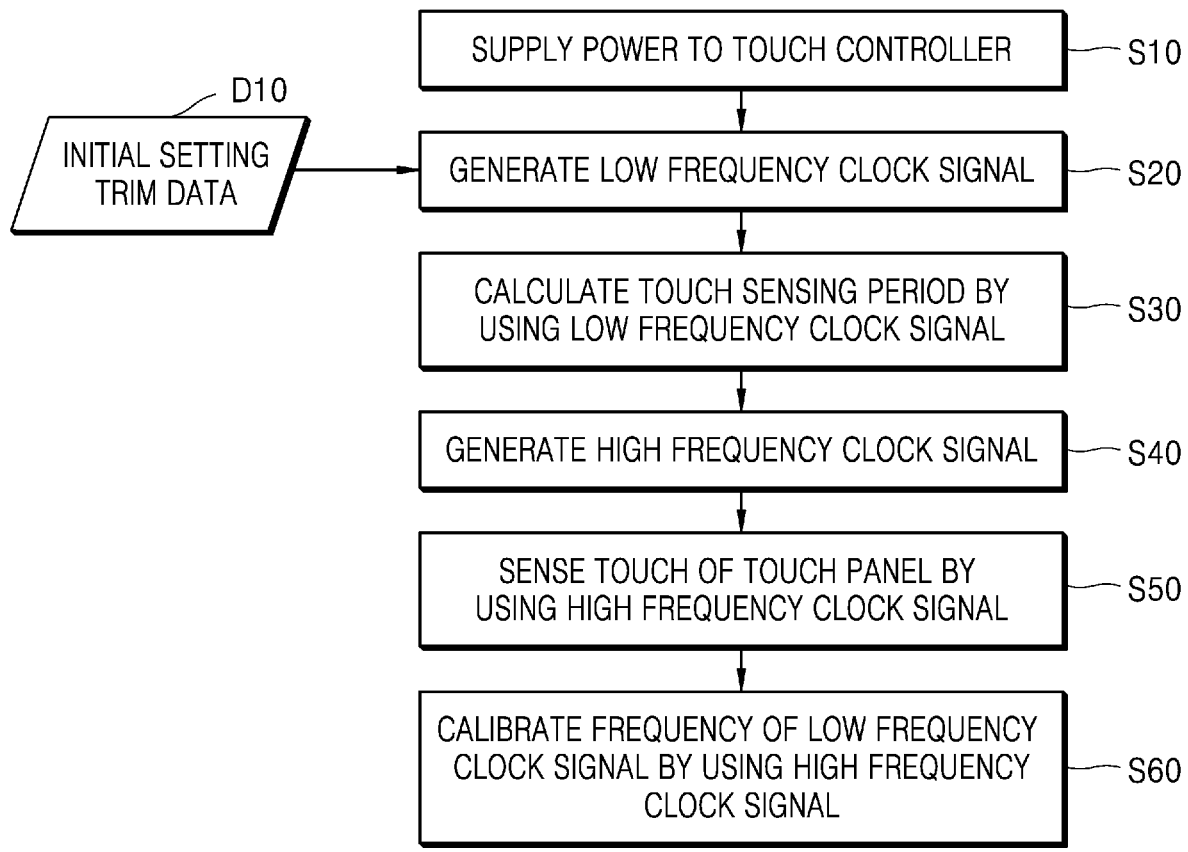
FIG. 8 is a flowchart describing an operating method of a touch controller according to an embodiment.

FIG. 8 is a flowchart describing an operating method of a touch controller according to an embodiment.

Referring to FIG. 8, in operation S10, power may be supplied to a touch controller (e.g., touch controller 210). When the touch controller is turned on, the touch controller may generate a low frequency clock signal (e.g., CLK_LF) in operation S20. In this case, the touch controller may generate the low frequency clock signal based on initial setting trim data D10. The low frequency clock signal may have a (an initial) frequency corresponding to the initial setting trim data D10.

In operation S30, the touch controller may calculate a touch sensing period by using the low frequency clock signal. For example, the touch controller may count the low frequency clock signal by a certain number, and thus, may determine a start time of a touch sensing interval and may determine the touch sensing interval.

In operation S40, the touch controller may generate a high frequency clock signal (e.g., CLK_HF), and in operation S50, the touch controller may sense a touch of a touch panel by using the high frequency clock signal in the touch sensing interval having the touch sensing period. In the touch sensing period, the touch controller may supply the touch panel with a driving signal generated based on the high frequency clock signal, and thus, may sense a touch of the touch panel.

For example, when a (first) touch, a non-touch, and a (second) touch are sequentially sensed in each of a plurality of touch sensing intervals continuously, the touch controller may determine that a touch of a double tap occurs. Alternatively, for example, when a touch is sensed in each of a plurality of touch sensing intervals which are continuously arranged, the touch controller may determine that a touch of a finger press occurs.

In operation S60, the touch controller may calibrate a frequency of the low frequency clock signal by using the high frequency clock signal. The touch controller may count a period of the low frequency clock signal by using the high frequency clock signal and may calibrate a frequency of the low frequency clock signal, based on a counting value.

The touch controller may operate in the normal mode or the idle mode. In an embodiment, operations S20 to S60 may be performed in the idle mode.

The touch controller according to an embodiment may calibrate a frequency of the low frequency clock signal by using the high frequency clock signal which has a higher frequency than that of the low frequency clock signal. The touch controller may calculate a touch sensing period by using the low frequency clock signal, and thus, the misrecognition of a touch may be prevented through an operation of calibrating a frequency of the low frequency clock signal. As the touch sensing period is changed (e.g., adjusted), the confusion of a finger tap and a finger press may be prevented, and the accuracy of touch sensing may increase.

Figure 9:
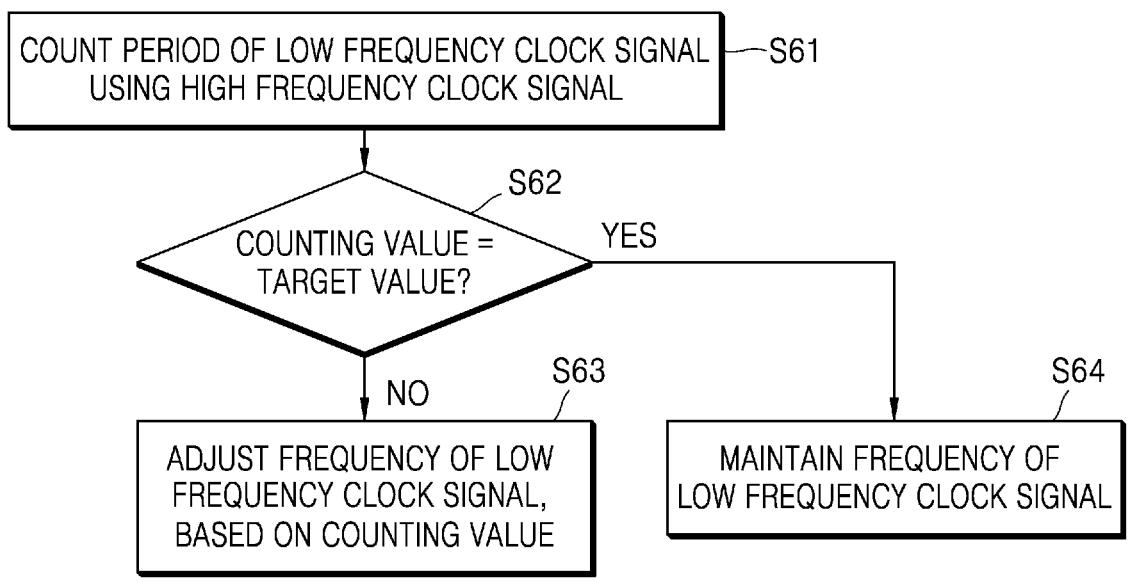
FIGS. 9 and 10 are flowcharts describing an operating method of a touch controller according to an embodiment.
Figure 10:
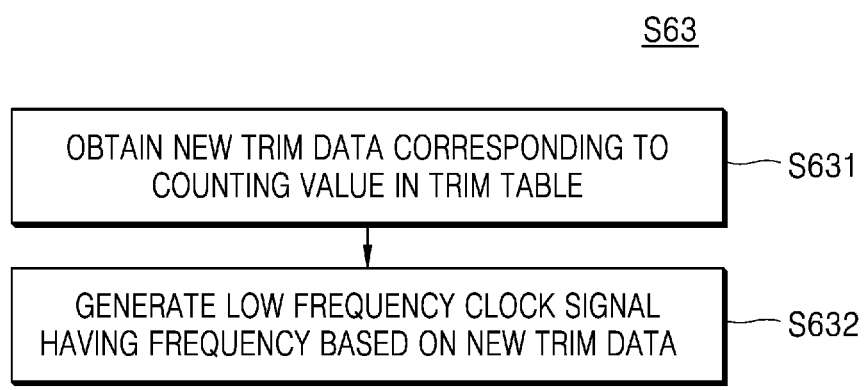

FIGS. 9 and 10 are flowcharts describing an operating method of a touch controller (e.g., touch controller 210) according to an embodiment. Operation S60 of FIG. 9 may be an example of operation S60 of FIG. 8 and may include operations S61 to S64. Operation S63 of FIG. 10 may be an example of operation S63 of FIG. 9 and may include operations S631 and S632.

Referring to FIG. 9, in operation S61, the touch controller may calibrate a frequency of a low frequency clock signal (e.g., CLK_LF) by using a high frequency clock signal (e.g., CLK_HF). A frequency of the high frequency clock signal may be higher than that of the low frequency clock signal, and thus, a period of the low frequency clock signal may be counted by counting a certain level (for example, a high level) of the low frequency clock signal with the high frequency clock signal.

In operation S62, the touch controller may check whether a counting value matches a target value. When the counting value matches the target value, the touch controller may maintain a frequency of the low frequency clock signal in operation S64. After operation S64, operations S30 to S60 may be performed again.

Referring to FIGS. 9 and 10, when the counting value differs from the target value, the touch controller may adjust a frequency of the low frequency clock signal, based on the counting value in operation S63. In operation S631, the touch controller may obtain new trim data (e.g., TD) corresponding to the counting value in a trim table. The trim table may store information about trim data corresponding to the degree of adjustment of a frequency of a low frequency clock signal. A frequency of the low frequency clock signal may be changed based on the trim data.

In operation S632, the touch controller may generate the low frequency clock signal having a (an adjusted) frequency based on the new trim data. After operation S632, operations S30 to S60 may be performed again.

Figure 11:
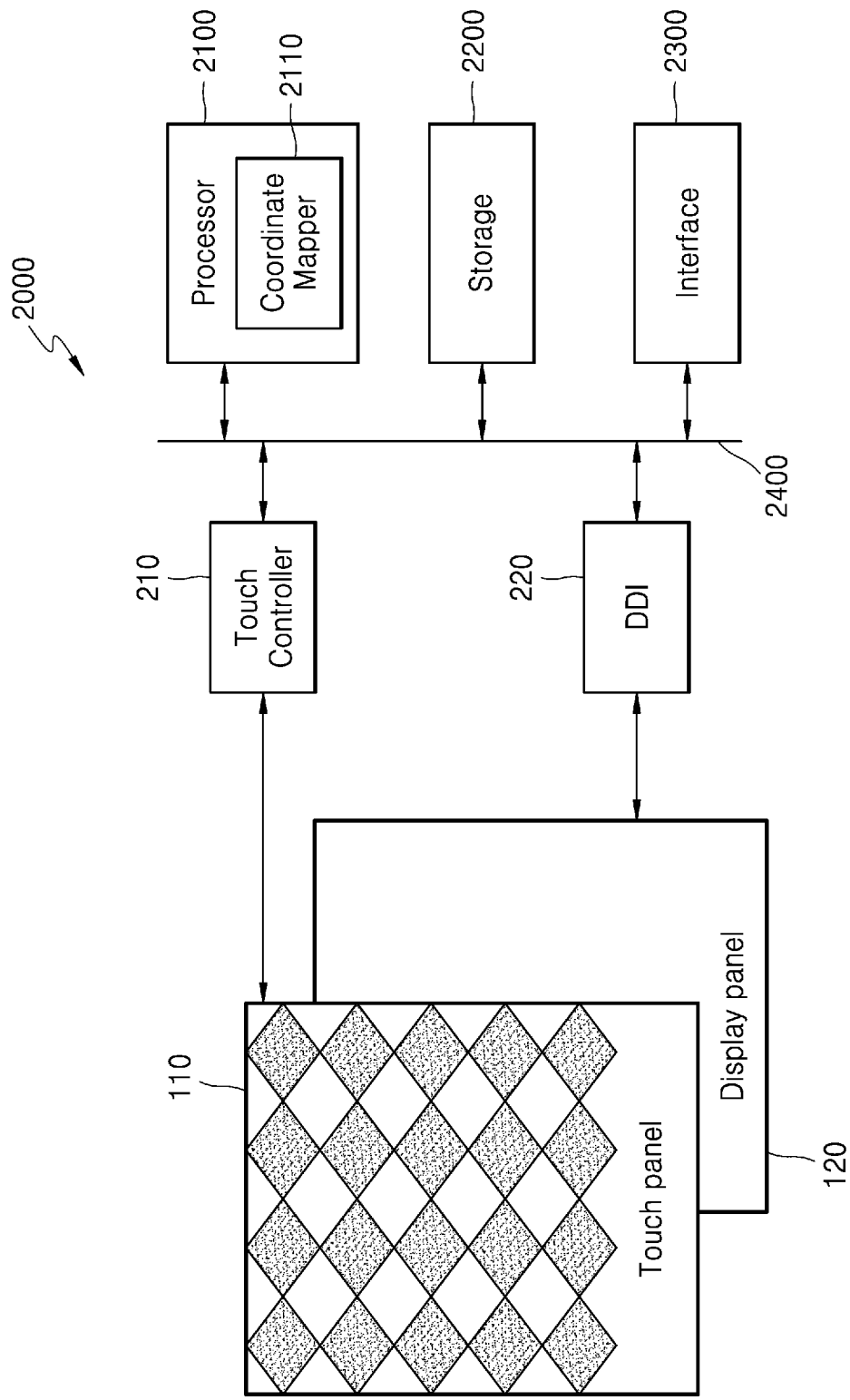
FIG. 11 is a block diagram illustrating a touch screen system according to an embodiment.

FIG. 11 is a block diagram illustrating a touch screen system 2000 according to an embodiment.

Referring to FIG. 11, the touch screen system 2000 may include a touch panel 110, a display panel 120, a touch controller 210, a display driving circuit 220, a processor 2100, a storage 2200, an interface 2300, and a bus 2400. The touch panel 110 may be configured to sense a touch event which occurs at each point. The display panel 120 may be configured as one of various types of panels such as an LED panel, an OLED panel, and an LCD panel each configured to display an image or a video. The touch panel 110 and the display panel 120 may be implemented as one body to overlap each other. The touch controller 210 may control an operation of the touch panel 110 and may transfer an output of the touch panel 110 to the processor 2100.

The display driving circuit 220 may control the display panel 120 to display an image on the display panel 120. Although not shown, the display driving circuit 220 may include a source driver, a grayscale voltage generator, a gate driver, a timing controller, a power supply, and an image interface. Image data to be displayed on the display panel 120 may be stored in the storage 2200 through the image interface and may be converted into an analog signal by using grayscale voltages generated by the grayscale voltage generator. The source driver and the gate driver may drive the display panel 120 in response to a vertical synchronization signal and a horizontal synchronization signal each supplied from the timing controller.

The processor 2100 may execute instructions and may control the overall operation of the touch screen system 2000. Program code or data needed by the processor 2100 may be stored in the storage 2200. The interface 2300 may communicate with an arbitrary external device and/or system. The processor 2100 may include a coordinate mapper 2110. A position of the touch panel 110 and a position of the display panel 120 may be mapped to each other, and the coordinate mapper 2210 may extract corresponding coordinates of the display panel 120 corresponding to a touch point, at which a touch input occurs, of the touch panel 110. Based on coordinate mapping between the touch panel 110 and the display panel 120, a user may perform an input action such as a touch operation, a drag operation, a pinch operation, a stretch operation, or a single or multi-touch operation, which selects and controls an icon, a menu item, or an image displayed on the display panel 120.

In an embodiment, the touch screen system 2000 may include a smart home appliance having an image display function. The smart home appliance may include, for example, at least one of a television, a digital video disk (DVD) player, an audio player, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a game console, an electronic dictionary, an electronic key, a camcorder, and an electronic picture frame, but not limited thereto.

In an embodiment, the touch screen system 2000 may include at least one of a medical device (e.g., a magnetic resonance angiography (MRA) device, a magnetic resonance imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., a naval navigation device, a gyroscope, or a compass), an avionic electronic device, a security device, an industrial or consumer robot, an automation teller's machine (ATM), and a point of sales (POS) system, but not limited thereto.

In an embodiment, the touch screen system 2000 may include at least one of furniture, part of a building/structure, an electronic board, an electronic signature receiving device, a projector, and various measuring devices (e.g., water, electricity, gas or electro-magnetic wave measuring devices), which include an image display function, but not limited thereto. An electronic device including the touch screen system 2000 according to various embodiments may be one or a combination of one or more of the various devices described above. Also, the touch screen system 2000 may be a flexible device. It may be obvious to one of ordinary skill in the art that the touch screen system 2000 according to various embodiments is not limited to devices described above.

The touch screen system 2000 may operate in the normal mode or the idle mode. The idle mode may be, for example, an operation mode where power consumption is less than that of the normal mode. In the idle mode, the touch controller 210 of the touch screen system 2000 may sense a touch of the touch panel 110 in a touch sensing interval. The touch controller 210 may calibrate a frequency of a low frequency clock signal for counting a touch sensing period of the touch sensing interval, based on a high frequency clock signal for driving the touch panel 110. Based on a calibration operation, a variation of a frequency of the low frequency clock signal may be small, and thus, the misrecognition of a touch may be prevented.

Hereinabove, embodiments have been described in the drawings and the specification. Embodiments have been described by using the terms described herein, but this has been merely used for describing the inventive concept and has not been used for limiting a meaning or limiting the scope of the inventive concept defined in the following claims. Therefore, it may be understood by those of ordinary skill in the art that various modifications and other equivalent embodiments may be implemented from the inventive concept. Accordingly, the spirit and scope of the inventive concept may be defined based on the spirit and scope of the following claims.

While the inventive concept has been particularly shown and described with reference to embodiments thereof, it will be understood that various changes in form and details may be made therein without departing from the spirit and scope of the following claims.

It should also be noted that in some alternate implementations, the functions/acts noted in flowchart blocks herein may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of the present invention.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein, the term "and/or" includes any and all combinations of one or more of the associated listed items. Moreover, the symbol "/" will be understood to be equivalent to the term "and/or."

It will be understood that although the terms "first," "second," etc. may be used herein to describe various elements, these elements should not be limited by these terms. These terms are only used to distinguish one element from another. Thus, a first element could be termed a second element without departing from the teachings of the present embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is turned over, elements described as "below" or "beneath" other elements or features would then be oriented "above" the other elements or features. Thus, the term "below" can encompass both an orientation of above and below. The device may be otherwise oriented (e.g., rotated 90 degrees or at other orientations) and the spatially relative descriptors used herein may be interpreted accordingly.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope is to be determined by the broadest permissible interpretation of the following claims and their equivalents, and shall not be restricted or limited by the foregoing detailed description.

What is claimed is:

1. A touch controller comprising:
a first clock generator that is configured to generate a low frequency clock signal to calculate a touch sensing period;
a second clock generator that is configured to generate a high frequency clock signal to perform a touch sensing operation; and
a first calibration circuit that is configured to calibrate a frequency of the low frequency clock signal by using the high frequency clock signal,
wherein the touch controller is configured to perform the touch sensing operation to sense a touch of a touch panel in the touch sensing period.

2. The touch controller of claim 1, wherein the first calibration circuit is configured to count a period of the low frequency clock signal using the high frequency clock signal and provide trim data to the first clock generator, based on a counting value of the period of the low frequency clock signal.

3. The touch controller of claim 2, wherein the first calibration circuit is configured to provide the trim data based on a trim table, and
wherein the trim table is configured to store information about the trim data corresponding to a degree of adjustment of the frequency of the low frequency clock signal.

4. The touch controller of claim 1, wherein the first calibration circuit is configured to provide initial setting trim data to the first clock generator when power is supplied to the touch controller, and
wherein the first clock generator is configured to generate the low frequency clock signal having a frequency corresponding to the initial setting trim data.

5. The touch controller of claim 1, further comprising a second calibration circuit that is configured to calibrate a frequency of the high frequency clock signal using a reference clock signal.

6. The touch controller of claim 5, wherein the reference clock signal is supplied from a circuit that is external to the touch controller.

7. The touch controller of claim 1, further comprising a transfer circuit that is configured to provide a driving signal to driving electrodes of the touch panel, wherein the second clock generator is configured to supply the high frequency clock signal to the transfer circuit.

8. The touch controller of claim 1, wherein the first clock generator comprises: a ring oscillator that includes a plurality of inverters and an output inverter;
a reference current generator that is configured to generate a reference current;
a plurality of transistors that are configured to generate a current based on the reference current; and
a plurality of switches configured to supply the current to the plurality of inverters, based on trim data.

9. An operating method of a touch controller, the operating method comprising:
supplying power to the touch controller;
generating a low frequency clock signal;
calculating a touch sensing period using the low frequency clock signal;
generating a high frequency clock signal;
sensing a touch of a touch panel using the high frequency clock signal in a touch sensing interval having the touch sensing period; and
calibrating a frequency of the low frequency clock signal by using the high frequency clock signal.

10. The operating method of claim 9, further comprising:
sensing the touch of the touch panel in an idle mode; and
changing a mode from the idle mode to a normal mode when the touch of the touch panel is sensed.

11. The operating method of claim 10, wherein the sensing of the touch of the touch panel comprises:
determining a finger press when the touch of the touch panel is sensed in a plurality of continuous touch sensing intervals;
determining a double tap when the touch of the touch panel comprises a first touch, a non-touch, and a second touch, and the first touch, the non-touch, and the second touch are sequentially sensed in the plurality of continuous touch sensing intervals; and
changing a mode from the idle mode to the normal mode when the double tap is sensed.

12. The operating method of claim 9, wherein the calibrating of the frequency of the low frequency clock signal comprises:
counting a period of the low frequency clock signal using the high frequency clock signal; and
maintaining the frequency of the low frequency clock signal when a counting value of the period of the low frequency clock signal matches a target value.

13. The operating method of claim 9, wherein the calibrating of the frequency of the low frequency clock signal comprises:
counting a period of the low frequency clock signal using the high frequency clock signal; and
adjusting the frequency of the low frequency clock signal when a counting value of the period of the low frequency clock signal differs from a target value.

14. The operating method of claim 13, wherein the adjusting of the frequency of the low frequency clock signal comprises:
obtaining new trim data corresponding to the counting value in a trim table; and
generating the low frequency clock signal having an adjusted frequency based on the new trim data.

15. The operating method of claim 9, wherein the generating of the low frequency clock signal comprises generating the low frequency clock signal having an initial frequency based on initial setting trim data.

16. The operating method of claim 9, further comprising calibrating a frequency of the high frequency clock signal using a reference clock signal supplied from a circuit that is external to the touch controller.

17. A touch screen device comprising:
a touch panel that includes a touch sensor array; and
a touch controller that is configured to supply a driving signal to the touch sensor array, wherein the touch controller is configured to generate the driving signal in a touch sensing interval using a high frequency clock signal, calculate a touch sensing period in the touch sensing interval using a low frequency clock signal, and calibrate a frequency of the low frequency clock signal using the high frequency clock signal.

18. The touch screen device of claim 17, wherein the touch controller is configured to calibrate the frequency of the low frequency clock signal based on a trim table, and
wherein the trim table is configured to store information about trim data corresponding to a degree of adjustment of the frequency of the low frequency clock signal.

19. The touch screen device of claim 17, wherein the touch controller is configured to generate the low frequency clock signal having an initial frequency based on initial setting trim data when power is supplied to the touch controller.

20. The touch screen device of claim 17, further comprising:
a display panel including a plurality of pixels; and
a display driving circuit that is configured to drive the display panel, wherein
the touch controller is configured to calibrate a frequency of the high frequency clock signal by using a reference clock signal that is supplied from the display driving circuit.

* * * * *